United States Patent
Hurlburt

(10) Patent No.: US 7,581,349 B2
(45) Date of Patent: Sep. 1, 2009

(54) METHOD AND APPARATUS FOR USING PRESSURIZED EXHAUST GASES TO CONTROL RODENTS

(75) Inventor: Allen Hurlburt, 1979 County Road 106, Tulelake, CA (US) 96134

(73) Assignee: Allen Hurlburt, Tulelake, CA (US)

(*) Notice: Subject to any disclaimer, the term of this patent is extended or adjusted under 35 U.S.C. 154(b) by 157 days.

(21) Appl. No.: 11/692,041

(22) Filed: Mar. 27, 2007

(65) Prior Publication Data

US 2007/0277428 A1    Dec. 6, 2007

Related U.S. Application Data

(60) Provisional application No. 60/803,692, filed on Jun. 1, 2006.

(51) Int. Cl.
*A01M 13/00* (2006.01)
(52) U.S. Cl. ........................................................ 43/124
(58) Field of Classification Search ............... 43/124, 43/125, 127, 129
See application file for complete search history.

(56) References Cited

U.S. PATENT DOCUMENTS

| 435,860 | A | * | 9/1890 | Russell | 43/127 |
|---|---|---|---|---|---|
| 721,535 | A | * | 2/1903 | Boylan | 43/127 |
| 1,309,193 | A | * | 7/1919 | Garrison | 43/127 |
| 1,492,732 | A | * | 5/1924 | Knopf | 43/124 |
| 1,529,785 | A | * | 3/1925 | Hammond et al. | 43/125 |
| 1,722,833 | A | * | 7/1929 | Abby | 43/129 |
| 1,930,588 | A | * | 10/1933 | Dibble | 43/127 |
| 2,413,143 | A | | 12/1946 | Jucksch | |
| 2,467,922 | A | * | 4/1949 | Woytal et al. | 285/8 |
| 4,005,976 | A | | 2/1977 | Rombach et al. | |
| 4,026,330 | A | * | 5/1977 | Dunn | 138/103 |
| 4,829,706 | A | * | 5/1989 | Perry | 43/125 |
| 4,833,818 | A | | 5/1989 | Berta | |
| 5,700,039 | A | * | 12/1997 | Manning | 285/148.23 |
| 5,860,243 | A | * | 1/1999 | Stager | 43/124 |
| 6,171,098 | B1 | | 1/2001 | Meyer | |
| 2005/0144832 | A1 | * | 7/2005 | Shaffer | 43/124 |
| 2006/0230671 | A1 | * | 10/2006 | Hudson et al. | 43/124 |
| 2008/0127547 | A1 | * | 6/2008 | Maas | 43/124 |
| 2008/0222942 | A1 | * | 9/2008 | Dalton | 43/58 |

* cited by examiner

*Primary Examiner*—Kurt Rowan
(74) *Attorney, Agent, or Firm*—Michael A. Glenn; Glenn Patent Group

(57) ABSTRACT

A method and apparatus for controlling rodents uses pressurized exhaust gases from an internal combustion engine. The gases are compressed and injected under pressure into underground burrows of rodents. The rodent tunnels fill with a very high concentration of such gases as carbon monoxide from the exhaust within just a few seconds.

14 Claims, 9 Drawing Sheets

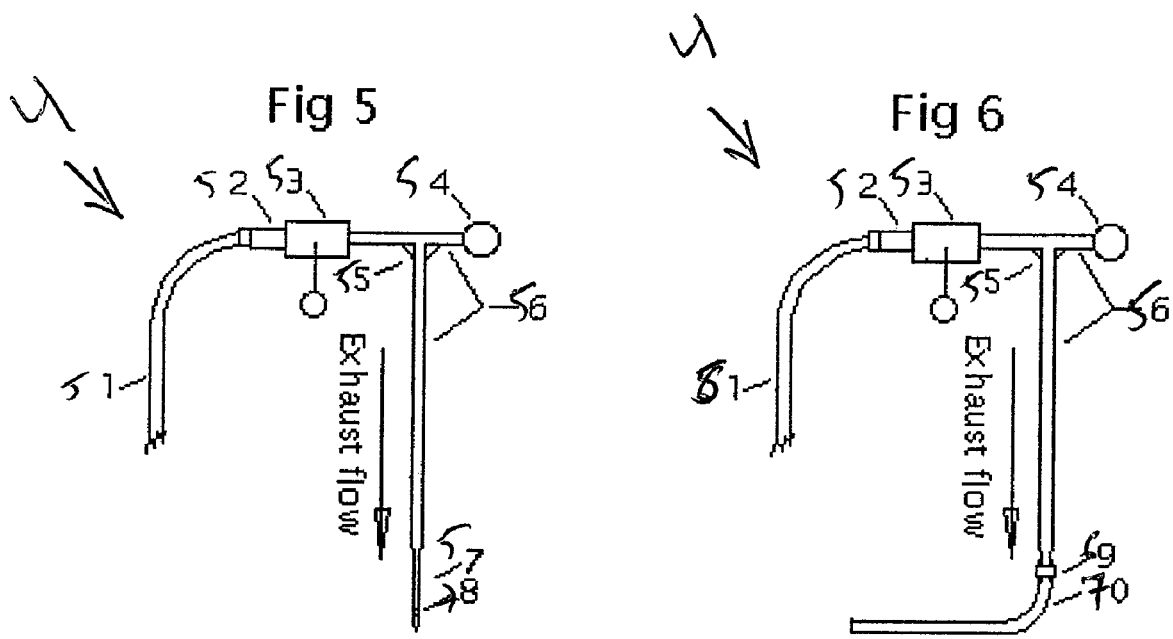

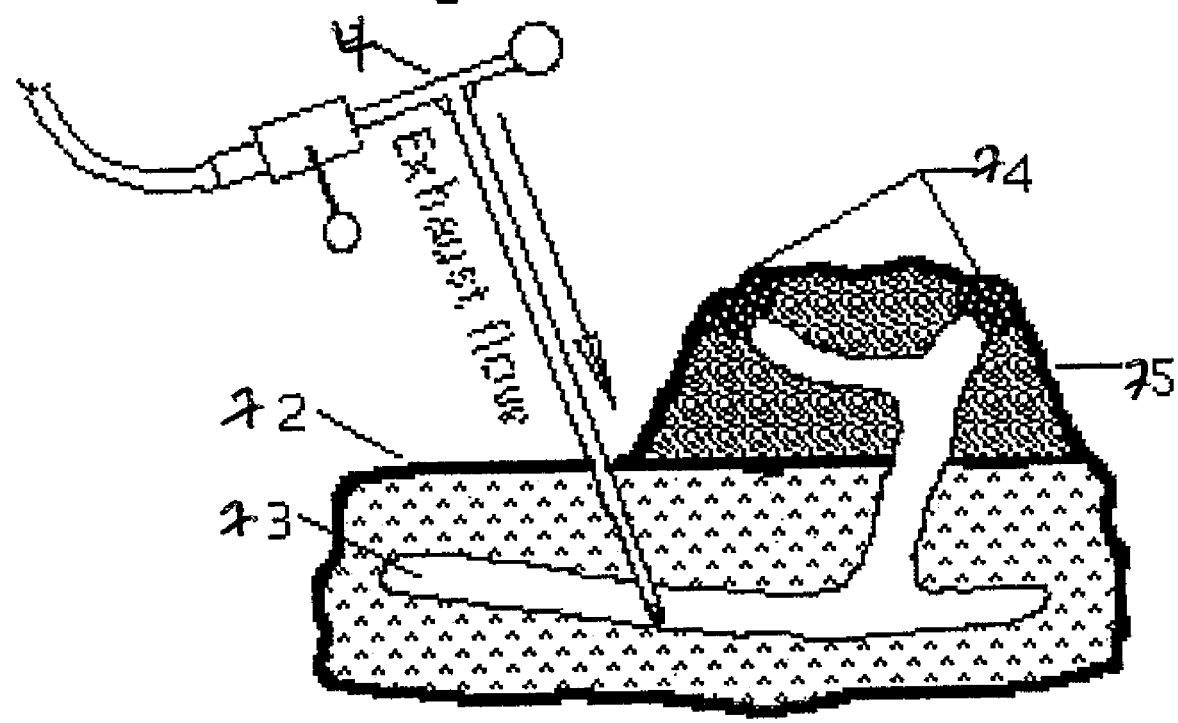

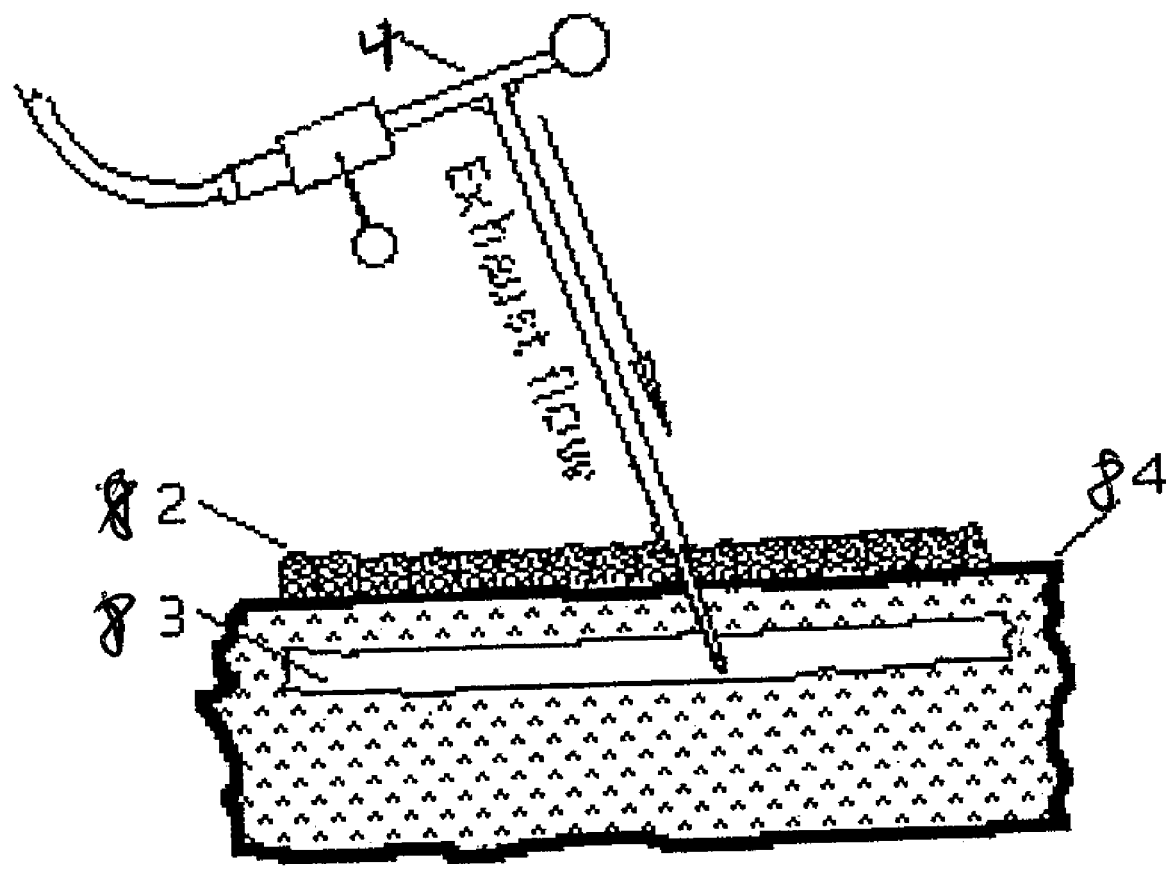

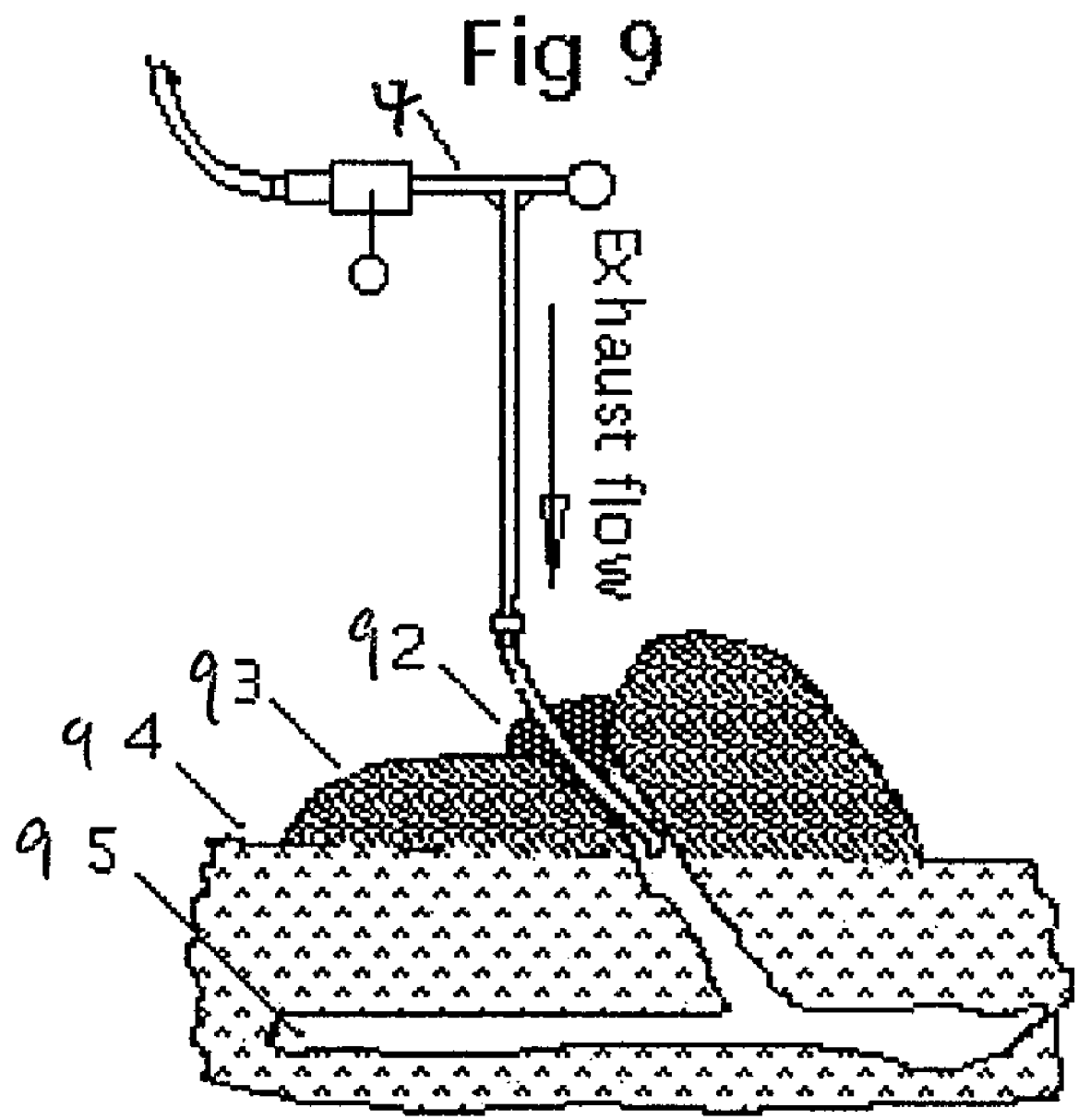

METHOD AND APPARATUS FOR USING PRESSURIZED EXHAUST GASES TO CONTROL RODENTS

CROSS REFERENCE TO RELATED APPLICATIONS

This application claims priority to U.S. provisional patent application Ser. No. 60/803,692, filed 1 Jun. 2006, which application is incorporated herein in its entirety by this reference thereto.

BACKGROUND OF THE INVENTION

1. Technical Field

The invention relates to pest control. More particularly, the invention relates to a method and apparatus for the use of pressurized exhaust gases to control rodents.

2. Description of the Prior Art

The infestation of cultivated lands by underground rodents has plagued farmers, gardeners, and groundskeepers alike for generations. Modern agricultural practices, such as weed-free border areas, as well as the wide spread use of sprinkler irrigation, have actually increased the amount of acreage which is a preferred habitat for gophers, moles, and ground squirrels. Perennial farmed crops, such as hay, and orchards are particularly difficult to protect. Thus, farmers pay a heavy price each year in lost productivity, in addition to the cost of ineffective control measures. For example, Kansas State University estimates that pocket gophers alone are responsible for a 20 to 50 percent drop in productivity in infested alfalfa fields and grassland.

Current control measures used by agriculturists include trapping, flooding, and poison bait inserted in the natural burrow or in an artificial burrow created with a chisel tooth. Existing devices using non-pressurized exhaust gases, such as carbon monoxide, from an internal combustion engine to poison underground rodents are labor intensive and ineffective. They require operators to dig out each individual burrow entrance and they result in very low kill rates. Poisoned bait, either placed in existing burrows by hand or in artificial burrows created for this purpose, has been partially effective in the past with good management, but current regulations limiting the kind and concentration of poison in rodent baits have seriously compromised its effectiveness. In addition, the creation of an artificial burrow to apply such bait destroys a portion of the very crop it is designed to protect.

The damage done by burrowing rodents is two-fold. Both the burrows and the rodents themselves damage the root system of crops and landscaping, resulting in reduced yields. In addition, gophers and ground squirrels create mounds of dirt excavated from their tunnels. These mounds, up to two feet in diameter and eight inches high, are a serious problem for hay farmers because they can break farming machinery and contaminate the hay with dirt. For example, mechanical harvesters for fruit orchards require flat, level ground between tree rows, so as not to damage the trees. Land that is riddled with gopher mounds thus requires the farmer to perform continual land shaping for harvest operations.

SUMMARY OF THE INVENTION

The invention comprises a method and apparatus that uses pressurized exhaust gases for controlling rodents. The exhaust gases from an internal combustion engine, for example, are compressed and injected under pressure into underground burrows of such rodents. The rodent tunnels fill with a very high concentration of such gases as carbon monoxide from the exhaust within just a few seconds. The pressurized injection of poisonous exhaust in the enclosed burrows has proven highly effective in field trials with preliminary kill rates of eighty to ninety percent.

BRIEF DESCRIPTION OF THE DRAWINGS

FIG. 3 is a schematic diagram showing cooling coils for use in connection with a device for rodent control according to the invention, in which FIG. 3a is a side view of a cooling coil and FIG. 3b is a top view of such a cooling coil;

FIG. 5 is a schematic diagram showing an exhaust applicator with a probe for use in connection for a rodent control device according to the invention;

FIG. 6 is a schematic diagram of an exhaust applicator with a flex hose for use with a device for rodent control according to the invention;

FIG. 7 is schematic diagram showing the use of a rodent control device to inject exhaust into a gopher burrow according to the invention;

FIG. 8 is a schematic diagram showing the use of a rodent control device to inject exhaust into a mole burrow according to the invention;

FIG. 9 is a schematic diagram showing the use of a rodent control device to inject exhaust into a ground squirrel burrow according to the invention.

DETAILED DESCRIPTION OF A PREFERRED EMBODIMENT

Figure 1:
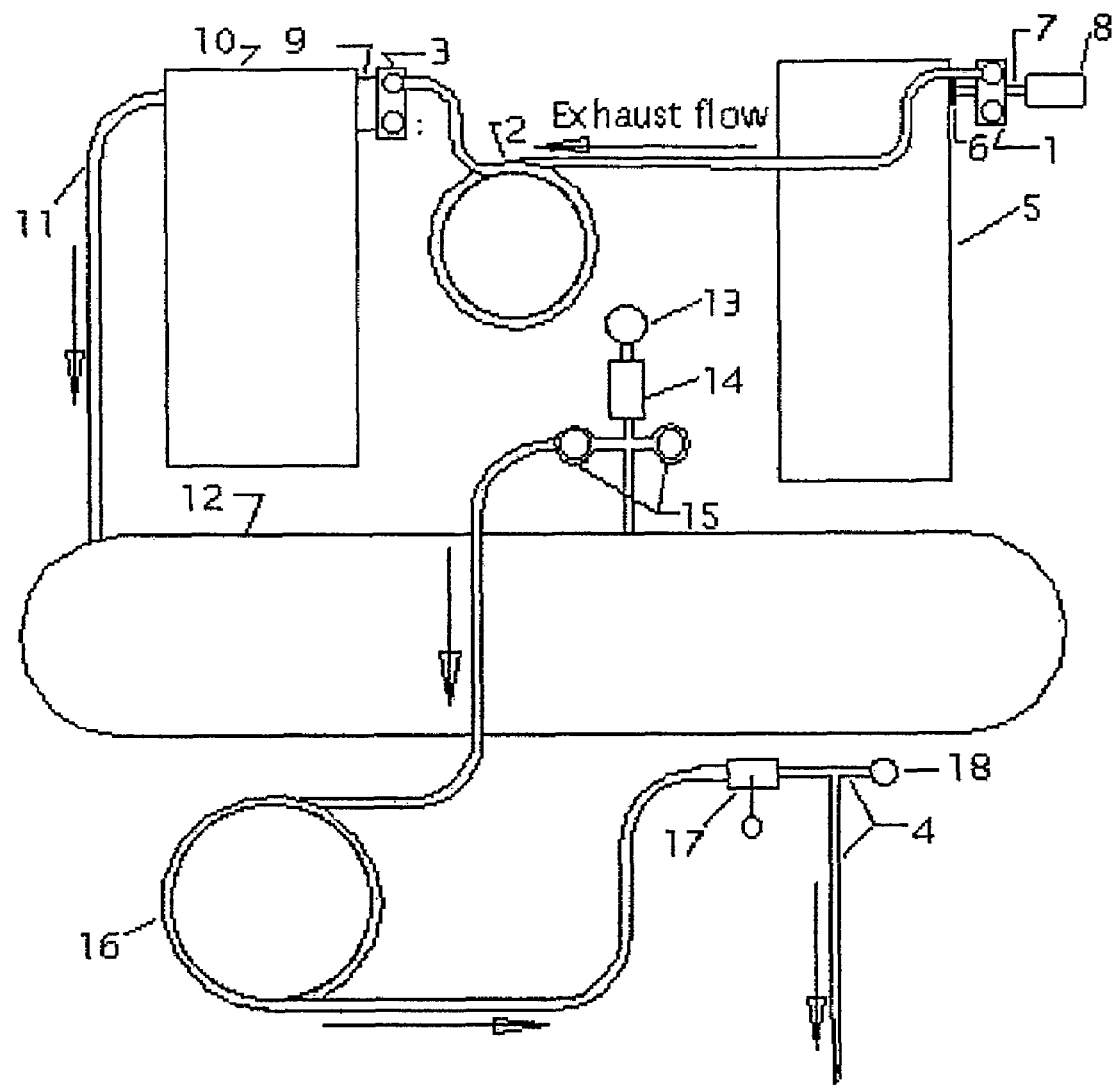
FIG. 1 is a schematic view of a device that uses compressed exhaust gases to control rodents according to the invention.

The invention comprises a method and apparatus that uses pressurized exhaust gases for controlling rodents. The exhaust gases from, for example, an internal combustion engine are compressed and injected under pressure into underground burrows of such rodents. The rodent tunnels fill with a very high concentration of such gases as carbon monoxide from the exhaust within just a few seconds. The pressurized injection of poisonous exhaust in the enclosed burrows as proven highly effective in field trials with preliminary kill rates of eighty to ninety percent.

The presently preferred embodiment of the invention uses an air compressor powered by an internal combustion engine. The exhaust produced by the internal combustion engine is diverted through a free-flow weldment manifold to a set of cooling coils. Cooled exhaust is routed by the cooling coils to the compression intake manifold that is attached to the intake port of the compressor unit. The compressed exhaust is stored in a pressure tank to be used as needed. Exhaust is released out of the pressure tank through a flexible air hose and injected into the burrows to eradicate underground rodents.

The exhaust supply manifold diverts the exhaust via a weldment using a pipe T between the muffler and the exhaust port. The exhaust supply manifold has one or more adaptation ports for connection and delivery of exhaust to an appropriately sized cooling mechanism. The cooling mechanism consists of tubing sized, and run appropriately, to reduce the temperature of exhaust passed from the exhaust supply manifold to the exhaust compression intake manifold. The exhaust compression intake manifold receives the exhaust from the cooling mechanism and transfers it through a port of equal size to the intake port of the compression device used.

The exhaust applicator is the means through which pressurized exhaust is inserted into the burrow. It receives the exhaust from the compression device through a flexible air hose. The transfer of the exhaust is controlled via a shutoff valve mounted on the exhaust applicator. Monitoring of injection pressure determines if the probe is in the burrow. Monitoring is performed with a pressure gauge that is mounted downstream of the shutoff valve. If the injector is in the burrow, the pressure registered on the pressure gauge decreases.

Depending on the kind of burrow, exhaust is inserted using either a rigid wand or a flexible tube. The probe used for closed burrows such as those of moles or ground squirrels is a small rigid tube with an enclosed end and perpendicular jets to route exhaust into the burrow. For open tunnels, this probe is replaced with flexible tubing that is inserted and sealed into open burrows.

In the presently preferred embodiment, the operator either inserts the exhaust applicator wand into the ground, intercepting the underground burrow, or inserts the flexible applicator tube into the open burrow and seals the burrow opening with dirt. The shutoff valve is then turned on to fill the burrow with a high concentration of pressurized exhaust.

FIG. 1 is a schematic diagram showing a device for rodent control that operates on compressed exhaust gases. While the source of exhaust gases in the preferred embodiment is the internal combustion engine, those skilled in the art will appreciate that other sources of gases may also be provided.

In FIG. 1, the exhaust supply manifold 1 receives exhaust gas from the exhaust port 6 on internal combustion engine 5. The exhaust gas passes through an exhaust pipe 7 and through the exhaust muffler 8 for venting to the atmosphere. The manifold also directs an exhaust flow through cooling coils 2 to an exhaust compression intake manifold 3 and thereafter through an intake port 9 to a compressor 10. The compressor compresses the cooled exhaust gas and a compressed exhaust line 11 directs the exhaust gas to a compressed exhaust storage tank 12. Pressure within the tank is indicated by a pressure gauge 13 that is coupled to the tank by a pressure regulator 14. The gases are provided to a rodent control device via one more quick coupling ports 15 to which a flexible air hose 16 may be connected. The air hose includes a shut off or control valve 17 at its far end which controls the flow of gas to an exhaust applicator 4. The pressure of the gas at the exhaust applicator can be indicated by an applicator pressure gauge 18.

Figure 2:
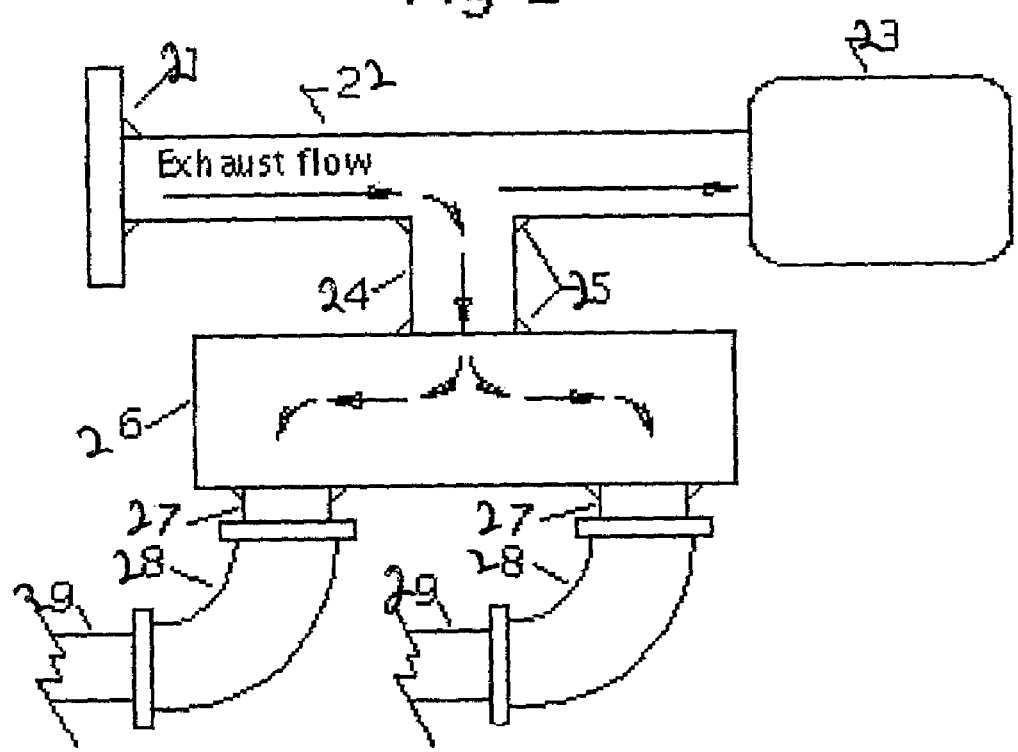
FIG. 2 is a schematic diagram showing an exhaust supply manifold for a rodent control device according to the invention.

FIG. 2 is a schematic diagram showing the exhaust supply manifold 1. An exhaust flow enters the manifold through an engine exhaust port flange 21 and is conducted via an exhaust pipe 22 to an exhaust muffler 23 for venting into the atmosphere. The exhaust flow is also conducted by an inlet connecting pipe 24 to an exhaust supply manifold 26. The exhaust pipe, interconnecting pipe, and the exhaust supply manifold in this embodiment of the invention are connected together by various welds 25. The output of the exhaust supply manifold is provided via one or more outlet connecting pipes 27 and a pipe elbow 28 to outlet tubing 29 for connection to cooling tubes, as discussed above. Those skilled in the art will appreciate that the various connections need not be made by welds as indicated above and that the size of the pipes and angles of bends are a matter of choice as well.

Figure 3:
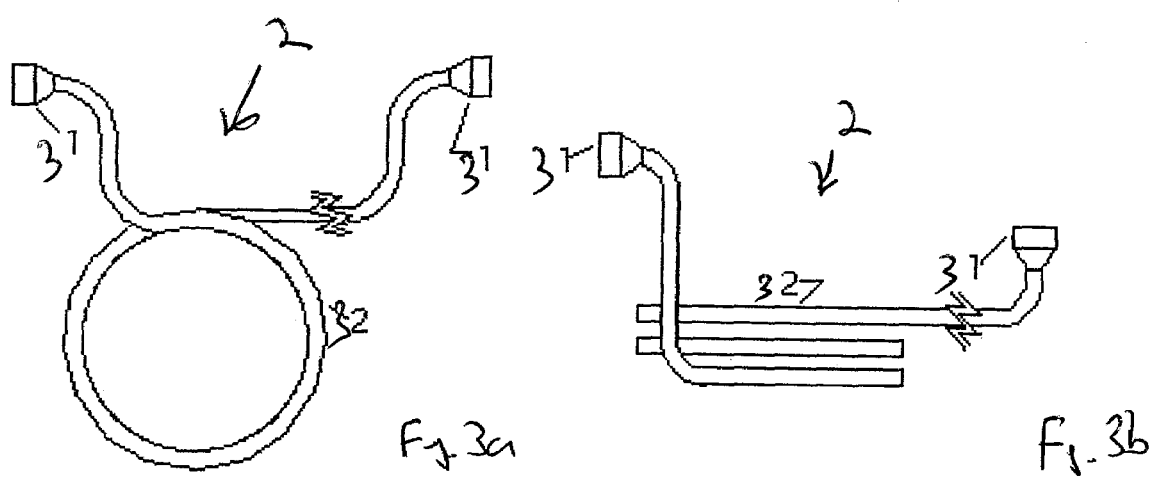

FIG. 3 is a schematic diagram showing the cooling coils. FIG. 3a is a side view of the cooling coils and FIG. 3b provides a top view of the cooling coils. The cooling coils include a set of flanged nuts 31 at each end and are formed of copper tubing 32 in the preferred embodiment. Those skilled in the art will appreciate that the composition and arrangement of cooling coils may be changed as a matter of choice.

Figure 4:
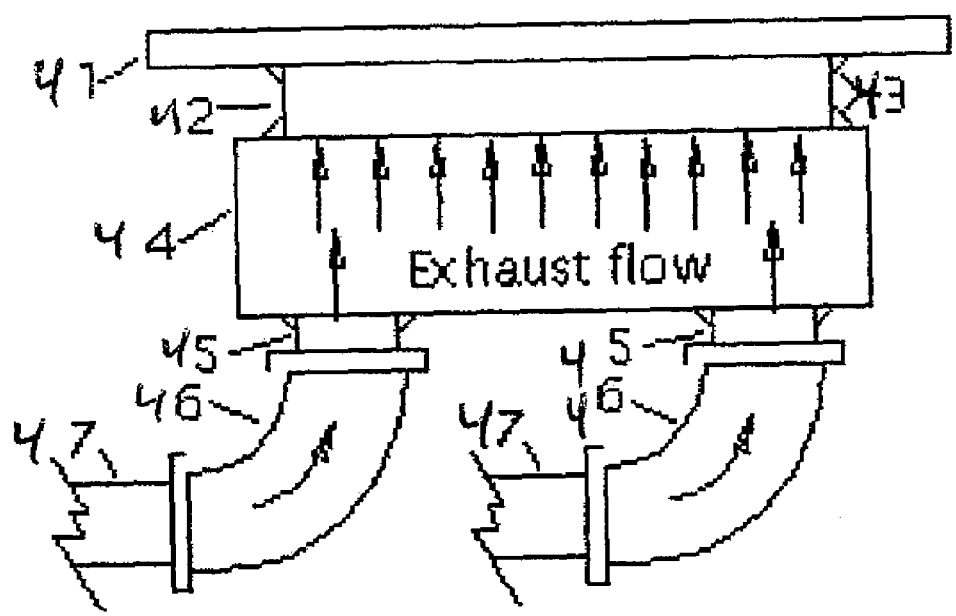
FIG. 4 is a schematic diagram showing an exhaust compression intake manifold for a device for rodent control according to the invention.

FIG. 4 is a schematic diagram showing an exhaust compression intake manifold 3 according to the invention. In FIG. 4, the exhaust gas from the cooling coils is coupled by and inlet tubing 7 and a pair of 90° elbows 46 through inlet connecting pipes 45 to an exhaust compression intake manifold 44. From the exhaust compression intake manifold, the exhaust gases are conducted via an intake port 42 to the compressor to which the exhaust compression intake manifold is coupled by an intake port flange 41. In FIG. 4, the intake port flange, intake port to the compressor, and the exhaust compression intake manifold are joined together by the series of welds 43. Those skilled in the art will appreciate that other forms of attachment may be provided.

FIGS. 5 and 6 are schematic diagrams showing an exhaust applicator 4. FIGS. 5 and 6 have in common a flexible hose 51 which receives the compressed exhaust gas. The hose is coupled to a shut off value 53 via a hose quick coupler 52. An applicator pressure gauge 54 alerts the operator to the pressure within the system being delivered at the applicator. In the preferred embodiment, a section of steel tubing is used to direct the exhaust flow to the delivery port of the applicator. The preferred embodiment, the steel tubing is formed as a T with a further piece of tubing extending between the shut off valve 53, and the pressure gauge 54. The steel tubing which forms the T is connected using a weld 55 in the preferred embodiment.

FIG. 5 provides an embodiment of the invention in which a probe 57, comprised of steel tubing, is coupled to opposing 5/64" jets 58 formed therein through which the exhaust gas is delivered.

FIG. 6 shows an alternate embodiment of an invention, in which a hose clamp 69 couples the exhaust flow. The hose clamp is used to hold a flexible hose 70 to couple the exhaust flow into an animal burrow. Those skilled in the art will appreciate that the examples of FIGS. 5 and 6 are illustrative and that other forms of delivery may be provided.

FIG. 7 is a schematic diagram showing exhaust being injected into a gopher burrow according to the invention. In FIG. 7, an applicator 4 is inserted through the ground surface 72 in the gopher burrow 73. The gopher mound 75 is sealed with a series of plugs 74 to prevent the gas from escaping.

FIG. 8 is a schematic diagram showing the use of an applicator floor to inject gas into a mole burrow. In FIG. 8, the applicator is inserted through the mole mound 82 and ground surface 84 in the mole burrow 83.

FIG. 9 is a schematic diagram showing exhaust injected into a ground squirrel burrow. In FIG. 9, the applicator 4 is terminated in the hose as discussed above in connection with FIG. 6. The hose extends through the ground squirrel mound 93 and ground surface 94 into the ground squirrel burrow 95. The area around the ground squirrel mound is sealed with dirt 92 packed about the burrow by the operator.

Figure 10:
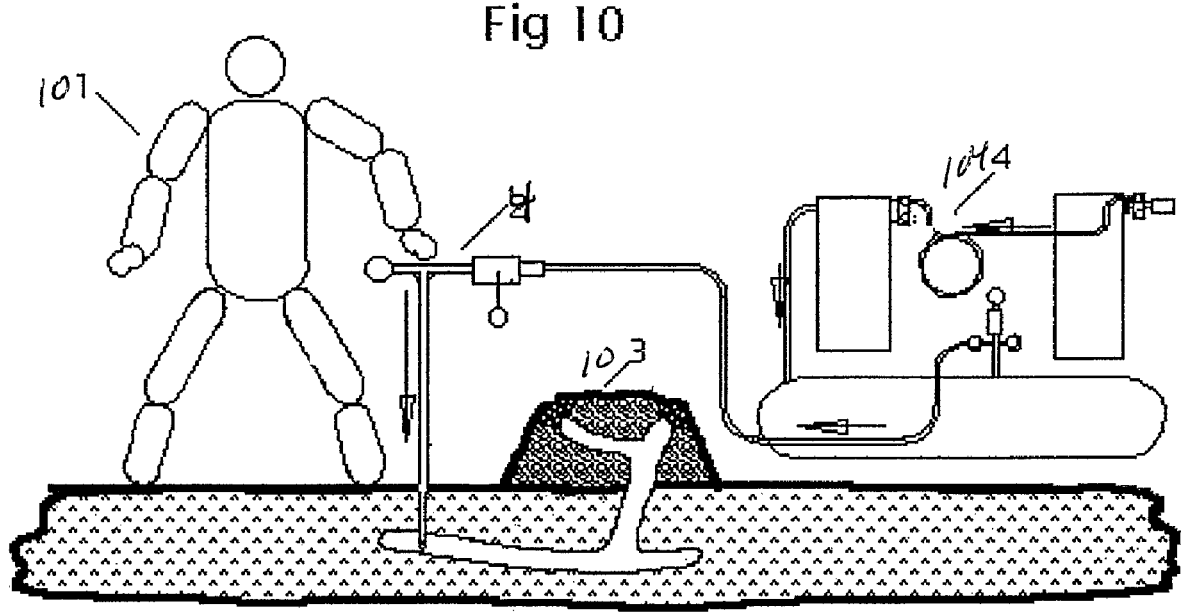
FIG. 10 is a schematic diagram showing the operation of a rodent control device according to the invention.

FIG. 10 is a schematic diagram showing operation of a rodent control device according to the invention. In FIG. 10, an operator 101 places an applicator 4 into a gopher burrow 103. Exhaust gas from the exhaust gas compressor, in accordance with FIG. 1 above for example, is routed through the applicator 4 into the burrow.

According to the foregoing, the invention provides for automation and mechanization for the delivery of gas. The pressurization of gas involved by any means increases delivery pressure above that of the exhaust provided directly by the internal combustion engine. For example, a blower, turbo charger, or compressed air source, such as a CO2 container, may be used instead of a reciprocating pump for pressurization of the fumigant of choice. The addition or substitution of fumigant materials may be made. Thus, while carbon monoxide is presently the preferred fumigant, other types of fumigants may be used to eradicate pests in connection with the invention herein disclosed. Further, the provision of the valve to control the flow of gas and the pressure gauge to monitor the injection pressure uniquely allows a level of sophistication in control during the application of fumigant heretofore unavailable, and thus provides a more certain technique for ridding farmers of these pests.

In the case of exhausting gases directly into a burrow from an engine of low pressure where the burrow is gradually filled, the rodent has sufficient time to react to the intrusion and escape. This is true with use of other types of fumigants such as ammonia and propane mixed with oxygen. Thus, the prior art achieves poor results. By injecting the gas at much higher pressure in volume as enabled by the invention, the pest is totally immersed by the gas and has no opportunity to escape before it becomes overcome by the gas. Further, by probing the burrow in several locations at the same time, the pest is engulfed by fumigant from all directions. In the case of gas or diesel engines, restriction of the exhaust may cause excessive internal temperatures that may ruin the engine. The invention herein does not restrict the exhaust flow in any way because the provision of the exhaust manifold allows normal exhaust from the engine. Rather, the invention draws upon the stream of exhaust gas naturally leaving the engine and takes what the compressor pump demands as far as pressurization of the exhaust.

According to the invention therefore, a method and apparatus is provided for instantaneous delivery of poison gas to overcome and prevent escape of a pest. In summary therefore, it is disclosed that the injection of cooled pressurized exhaust from an internal combustion engine into a burrow of a pest is an effective method of exterminating the pest. The combination of cooling, pressurization, and storage as set forth herein uniquely provides the opportunity to deliver such exhaust gases from an internal combustion engine, where the internal combustion engine is merely a source of a gas and not the delivery mechanism itself. The higher pressure injection of exhaust fills the burrow with poisonous gases faster than a pest can react, whereas the prior art creates odor, turbulence, or atmospheric pressure changes that would otherwise alert the pest.

The use of pressurized exhaust delivery also allows for substantially higher volume of poisonous exhaust to be delivered into the burrow, resulting in measurably more effective fumigation. The pressurized storage of the exhaust creates a reservoir poisonous carbon monoxide, for example which is sufficient to fill a burrow completely and rapidly. The cooling coils reduce the temperature of the gas prior to compression, which allows for greater concentration of exhaust within the storage tank in a safe fashion. The exhaust applicator herein is an effective indirect means for pumping exhaust into pest tunnels, therefore eliminating the need to dig out a burrow to exterminate rodents.

The combination of a valve and pressure gauge with the injector probe allows the operator to find the underground burrow more accurately. When the value is turned on after injection, the pressure drops if the applicator is in the burrow. If the applicator is not in the burrow, the pressure increases.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. An apparatus for controlling rodents, comprising:
   means for compressing exhaust gases from an internal combustion engine and for injecting said gases under pressure into underground burrows of said rodents;
   wherein said rodent burrows quickly fill with a very high concentration of said gases;
   said means for compressing and injecting further comprising:
      an exhaust supply manifold for diverting a portion of exhaust gas from said internal combustion engine without restricting an exhaust flow from said engine;
      wherein a stream of exhaust gas is drawn from exhaust gas leaving said engine based on demand for pressurization and delivery of said exhaust gas by said apparatus;
      a free-flow manifold for receiving said diverted exhaust gas;
      a set of cooling coils for receiving said exhaust gas from said manifold;
      a compressor, wherein cooled exhaust gas is routed by said cooling coils to an exhaust compression intake manifold that is attached to an intake port of said compressor;
      a pressure tank for storing compressed exhaust gas from said compressor;
      a flexible air hose, wherein exhaust gas is controllably released out of the pressure tank through a flexible air hose; and
      an exhaust applicator for injecting pressurized exhaust gas into said rodent burrows.

2. The apparatus of claim 1, said exhaust supply manifold comprising a pipe T between a muffler associated with said internal combustion engine and an exhaust port;
   said exhaust supply manifold comprising one or more adaptation ports for connection and delivery of exhaust gas to said cooling coils.

3. The apparatus of claim 1, said cooling coils comprising tubing sized, and run appropriately, to reduce the temperature of exhaust gas passed from said exhaust supply manifold to said exhaust compression intake manifold.

4. The apparatus of claim 1, said exhaust compression intake manifold receiving said exhaust gas from said cooling coils and transferring said exhaust gas through a port of substantially equal size to said intake port of said compressor.

5. The apparatus of claim 1, said exhaust applicator further comprising:
   means for receiving said exhaust gas from said compressor through said flexible air hose; and
   a probe for inserting pressurized exhaust into said rodent burrow.

6. The apparatus of claim 1, said exhaust applicator further comprising:
   a shutoff valve mounted on the exhaust applicator for controlling transfer of said exhaust gas.

7. The apparatus of claim 1, said exhaust applicator further comprising:
   a pressure gauge mounted downstream of said shutoff valve for monitoring injection pressure and for determining if said probe is in said rodent burrow;

wherein if said injector is in said rodent burrow, pressure registered on said pressure gauge decreases.

8. The apparatus of claim 5, said probe comprising either of:
   a rigid wand comprising a rigid tube having an enclosed end and perpendicular jets to route exhaust gas into said rodent burrow; and
   a flexible tube that is inserted and sealed into open rodent burrows.

9. A method for controlling rodents, comprising the steps of:
   compressing exhaust gases from an internal combustion engine; and
   injecting said gases under pressure into underground burrows of said rodents;
   wherein said rodent burrows quickly fill with a very high concentration of said gases;
   said compressing and injecting steps being performed by:
      diverting a portion of exhaust gas from said internal combustion engine with an exhaust supply manifold without restricting an exhaust flow from said engine;
      drawing a stream of exhaust gas from exhaust gas leaving said engine based on demand for pressurization and delivery of said exhaust gas;
      receiving said diverted exhaust gas at a free-flow manifold;
      receiving said exhaust gas from said manifold at a set of cooling coils;
      routing cooled exhaust gas by said cooling coils to an exhaust compression intake manifold that is attached to an intake port of a compressor;
      storing compressed exhaust gas from said compressor in a pressure tank;
      controllably releasing exhaust gas out of the pressure tank through a flexible air hose; and
      injecting pressurized exhaust gas into said rodent burrows with an exhaust applicator.

10. The method of claim 9, further comprising the step of:
    an operator either inserting an exhaust applicator wand into an underground rodent burrow, or inserting a flexible applicator tube into a open rodent burrow and sealing said rodent burrow opening with dirt.

11. The method of claim 9, wherein exhaust gas is injected into a gopher burrow by the steps of:
    inserting an applicator through the ground surface and into said gopher burrow; and
    sealing a gopher mound with a series of plugs to prevent said exhaust gas from escaping.

12. The method of claim 9, wherein exhaust gas is injected into a mole burrow by the step of:
    inserting an applicator through a mole mound and ground surface and into said mole burrow.

13. The method of claim 9, wherein exhaust gas is injected into injected into a ground squirrel burrow, by the steps of:
    terminating an applicator in a hose that extends through a ground squirrel mound and ground surface said the ground squirrel burrow; and
    sealing an area around said ground squirrel mound with dirt packed about said ground squirrel burrow.

14. The method of claim 9, further comprising the step of:
    probing said rodent burrow in several locations at the same time;
    wherein a pest is engulfed by exhaust gas from all directions.

* * * * *